(12) United States Patent
Kinomura et al.

(10) Patent No.: US 7,461,663 B2
(45) Date of Patent: Dec. 9, 2008

(54) CLEANING APPARATUS

(75) Inventors: Yoshitaka Kinomura, Gifu (JP); Teruo Hiraoka, Tokyo (JP); Kojiro Ohkawa, Osaka (JP)

(73) Assignees: Sanyo Electric Co., Ltd., Osaka (JP); Giga Tech Inc., Tokyo (JP); Ohkawa & Co., Ltd., Osaka (JP)

( * ) Notice: Subject to any disclaimer, the term of this patent is extended or adjusted under 35 U.S.C. 154(b) by 518 days.

(21) Appl. No.: 11/214,026

(22) Filed: Aug. 30, 2005

(65) Prior Publication Data
US 2006/0042667 A1    Mar. 2, 2006

(30) Foreign Application Priority Data
Sep. 1, 2004    (JP)    ............................. 2004-254655

(51) Int. Cl.
*B08B 3/04* (2006.01)

(52) U.S. Cl. .................. 134/104.1; 134/21; 134/102.2; 134/108; 134/902

(58) Field of Classification Search .................. 134/84, 134/104.1, 108, 21, 95.2, 102.2, 105, 135, 134/902
See application file for complete search history.

(56) References Cited
U.S. PATENT DOCUMENTS

| | | | | |
|---|---|---|---|---|
| 349,828 A * | 9/1886 | Vittorio | ........................ | 116/37 |
| 4,693,777 A * | 9/1987 | Hazano et al. | ......... | 156/345.31 |
| 4,867,186 A * | 9/1989 | Otsuka | ........................ | 134/111 |
| 5,937,675 A * | 8/1999 | Stucker | ........................ | 68/18 R |
| 6,076,537 A * | 6/2000 | Brink et al. | ................ | 134/57 R |
| 6,612,317 B2 * | 9/2003 | Costantini et al. | ......... | 134/58 R |
| 2005/0121144 A1 * | 6/2005 | Edo et al. | .............. | 156/345.32 |
| 2006/0042669 A1 * | 3/2006 | Kinomura et al. | ............ | 134/135 |
| 2007/0289604 A1 * | 12/2007 | Fukunaga et al. | ............... | 134/3 |

FOREIGN PATENT DOCUMENTS

JP    2004-103269    4/2004

* cited by examiner

*Primary Examiner*—Michael Barr
*Assistant Examiner*—Rita R Patel
(74) *Attorney, Agent, or Firm*—Morrison & Foerster LLP

(57) ABSTRACT

The cleaning apparatus of the invention includes first and second cleaning tanks cleaning a mask with a predetermined cleaning solution, a vacuum evaporator vacuum-distilling the cleaning solution of the first and second cleaning tanks, a first cooler cooling the vacuum-distilled cleaning solution to room temperature, a first return pipe returning the cleaning solution cooled by the first cooler to the second cleaning tank, first and second rinse tanks rinsing the mask with a predetermined rinse solution, an atmospheric evaporator distilling the rinse solution of the first and second rinse tanks at atmospheric pressure, a second cooler cooling the rinse solution distilled at atmospheric pressure to room temperature, and a second return pipe returning the rinse solution cooled by the second cooler to the second rinse tank.

16 Claims, 8 Drawing Sheets

TURN BY 90°

CLEANING APPARATUS

CROSS-REFERENCE OF THE INVENTION

This invention is based on Japanese Patent Application No. 2004-254655, the content of which is incorporated by reference in its entirety.

BACKGROUND OF THE INVENTION

1. Field of the Invention

The invention relates to a cleaning apparatus, particularly to a cleaning apparatus removing an organic material for an organic EL element attaching to a mask made of a thin metal film in a process of vapor-depositing the organic material.

2. Description of the Related Art

In recent years, an organic electroluminescent (hereafter, referred to as EL) display device with an organic EL element is receiving attention as a display device substituting for a CRT and an LCD. For example, research and development are being pursued for the organic EL display device having a driving thin film transistor (hereafter, referred to as a driving TFT) for driving the organic EL element.

The organic EL element has a structure laminated with an anode made of ITO, a hole transport layer made of a first hole transport layer made of MTDATA (4,4-bis(3-methylphenylphenylamino)biphenyl) and a second hole transport layer made of TPD (4,4,4-tris(3-methylphenylphenylamino)triphenylanine), an emissive layer made of $Bebq_2$ (bis(10-hydroxybenzo[h]quinolinato)beryllium) containing a quinacridone derivative, an electron transport layer made of $Bebq_2$, and a cathode made of aluminum alloy and so on, in this order.

In such an organic EL element, light is emitted by flowing a current through the driving TFT for driving the organic EL element. That is, holes injected from the anode and electrons injected from the cathode are recombined in the emissive layer and excitons are generated by exciting organic molecules forming the emissive layer. Light is emitted from the emissive layer in a process of radiation of the excitons and then released outside after going through the transparent anode to the insulation substrate made of a glass substrate or the like, thereby completing light-emission.

Organic materials used for forming the hole transport layer, the emissive layer, and the electron transport layer among the layers of this organic EL element have low resistance to solvents and moistures. Therefore, a photolithography can not be used in a semiconductor process. Therefore, pattern formation of the hole transport layer, the emissive layer, the electron transport layer, and the cathode of the organic EL element has been made by selectively vapor-depositing the organic material on the insulation substrate having the driving TFT by a vapor-deposition method using a mask (a so-called shadow mask) made of, for example, a thin metal film.

An example of such a mask used when the organic material is vapor-deposited is shown in FIGS. 15 to 17. FIG. 15 is a top view of a conventional mask for forming an organic EL element. FIG. 16 shows a cross-sectional view along line X-X of FIG. 15, and FIG. 17 shows a cross-sectional view along line Y-Y of FIG. 15. As shown in FIGS. 15 to 17, a mask 10 is made of a thin metal film such as nickel (Ni) and iron (Fe) with a plurality of fine holes 11 of several micrometers by several micrometers. The organic material is selectively vapor-deposited on the insulation substrate through these holes 11.

The mask 10 made of the thin metal film is fixed to a metal frame 12 made of, for example, nickel (Ni) and iron (Fe), and an edge of the mask 10 is supported by the metal frame 12. An edge of the metal frame 12 is formed with a plurality of lock portions 13 for holding the metal frame 12. Hereafter, the mask 10 fixed to the metal frame 12 will be collectively called the "mask 10."

The relevant technology is disclosed in Japanese Patent Application No. 2004-103269.

When the organic EL element has emissive layers of three primary colors of red, green, and blue for color display, generally, the process of vapor-depositing the organic material is performed by repeatedly using the mask for each of the colors. Therefore, as the number of repeated vapor-deposition processes increases more, more organic materials are attached and laminated on a surface of the mask 10. That is, as shown in FIG. 18 showing a cross-sectional view of the mask vapor-deposited with the organic material, the organic material 1 is attached not only to the surface of the mask 10 but also to edges of the holes 11 to form overhangs 1a almost blocking the holes 11 which the organic material 1 passes through.

In this manner, since the holes 11 of the mask 10 are narrowed by the overhangs made of the organic material, there is a problem that accuracy in vapor-depositing the organic material on the insulation substrate lowers.

For solving this problem, there is a method of discarding a used mask and using an unused mask in each vapor-deposition process without reusing the same mask. However, in this method, there is a problem that the cost increases because the masks used for vapor-depositing the organic material for an organic EL element are expensive.

SUMMARY OF THE INVENTION

The invention provides a cleaning apparatus cleaning a deposition mask used for depositing organic electroluminescent materials. The apparatus includes a cleaning tank containing a cleaning solution and configured to receive the deposition mask for cleaning, a vacuum evaporator receiving the cleaning solution from the cleaning tank and evaporating the cleaning solution in a vacuum, a first cooler cooling the cleaning solution evaporated by the vacuum evaporator, and a first return pipe returning the cleaning solution cooled by the first cooler to the cleaning tank. The apparatus also includes a rinse tank containing a rinse solution and configured to receive the deposition mask cleaned in the cleaning tank, an atmospheric evaporator receiving the rinse solution from the rinse tank and evaporating the rinse solution in an atmospheric pressure, a second cooler cooling the rinse solution evaporated by the atmospheric evaporator, and a second return pipe returning the rinse solution cooled by the second cooler to the rinse tank.

DETAILED DESCRIPTION OF THE INVENTION

Figure 15:
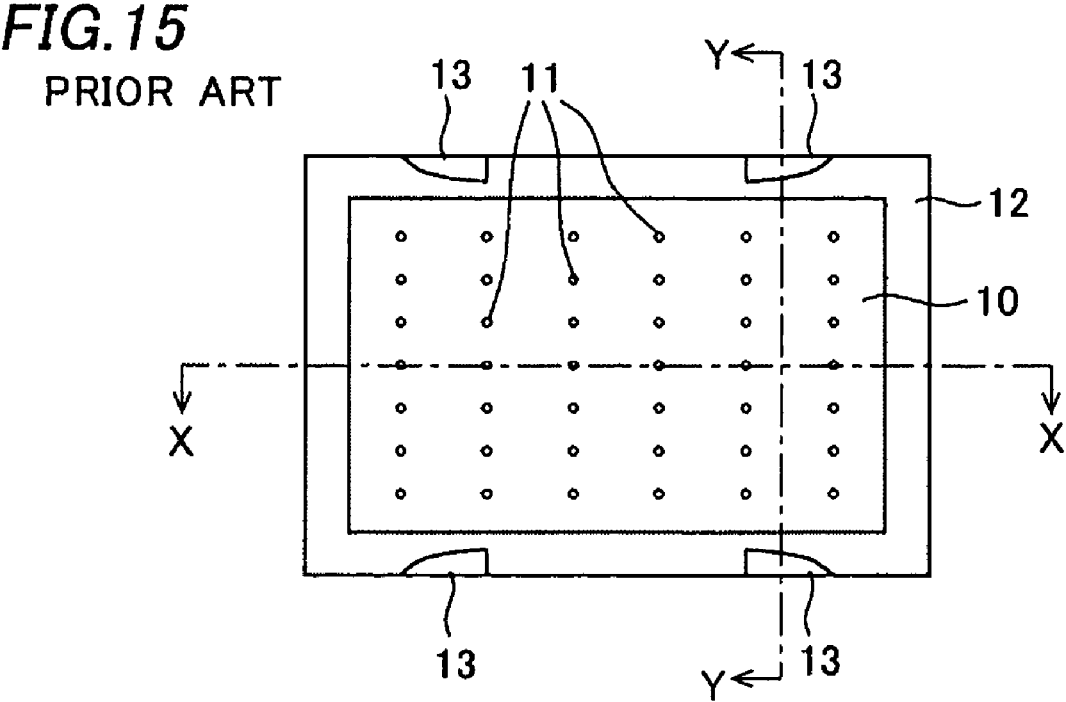
FIG. 15 shows a top view for explaining a mask for forming an organic EL element of a conventional art.
Figure 16:
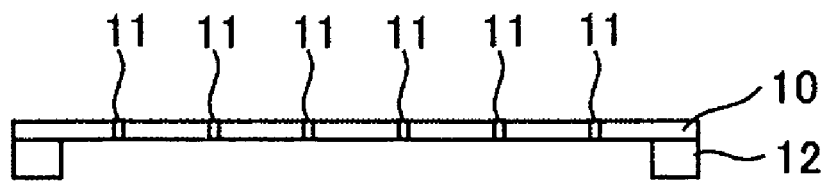
FIG. 16 shows a cross-sectional view along line X-X of FIG. 15.
Figure 17:
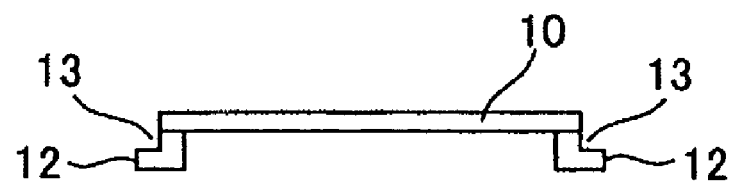
FIG. 17 shows a cross-sectional view along line Y-Y of FIG. 15.
Figure 18:
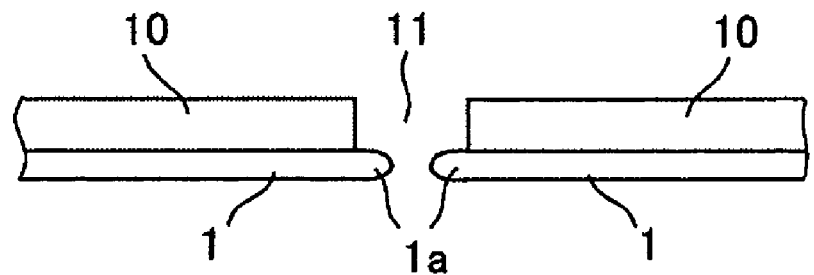
FIG. 18 shows a cross-sectional view of a mask vapor-deposited with an organic material of a conventional art.

A cleaning apparatus of an embodiment of the invention will be described hereafter. The mask which is cleaned in this embodiment is the same as the mask 10 used in a conventional vapor-deposition process shown in FIGS. 15 to 17. That is, the mask is made of a thin metal film where holes 11 of several micrometers by several micrometers are formed according to a predetermined pattern for an organic material. This thin metal film is made of, for example, nickel (Ni) and iron (Fe). Alternatively, the mask may be made of a material other than a metal. For example, the mask may be made of a resin film. A metal frame 12 made of, for example, nickel (Ni) and iron (Fe) is fixed to an edge of the mask. This metal frame 12 has lock portions 13. The mask 10 fixed to the metal frame 12 is collectively called the "mask 10."

The cleaning apparatus of the embodiment removes an organic material for an organic EL element attaching to the mask 10 made of the thin metal film used for vapor-deposition in a process of vapor-depositing the organic material on an insulation substrate formed with a driving TFT. The cleaning apparatus of the embodiment has a cleaning system for removing the organic material for the organic EL element attaching to the mask 10 and a carrying system for carrying the mask 10.

Figure 1:
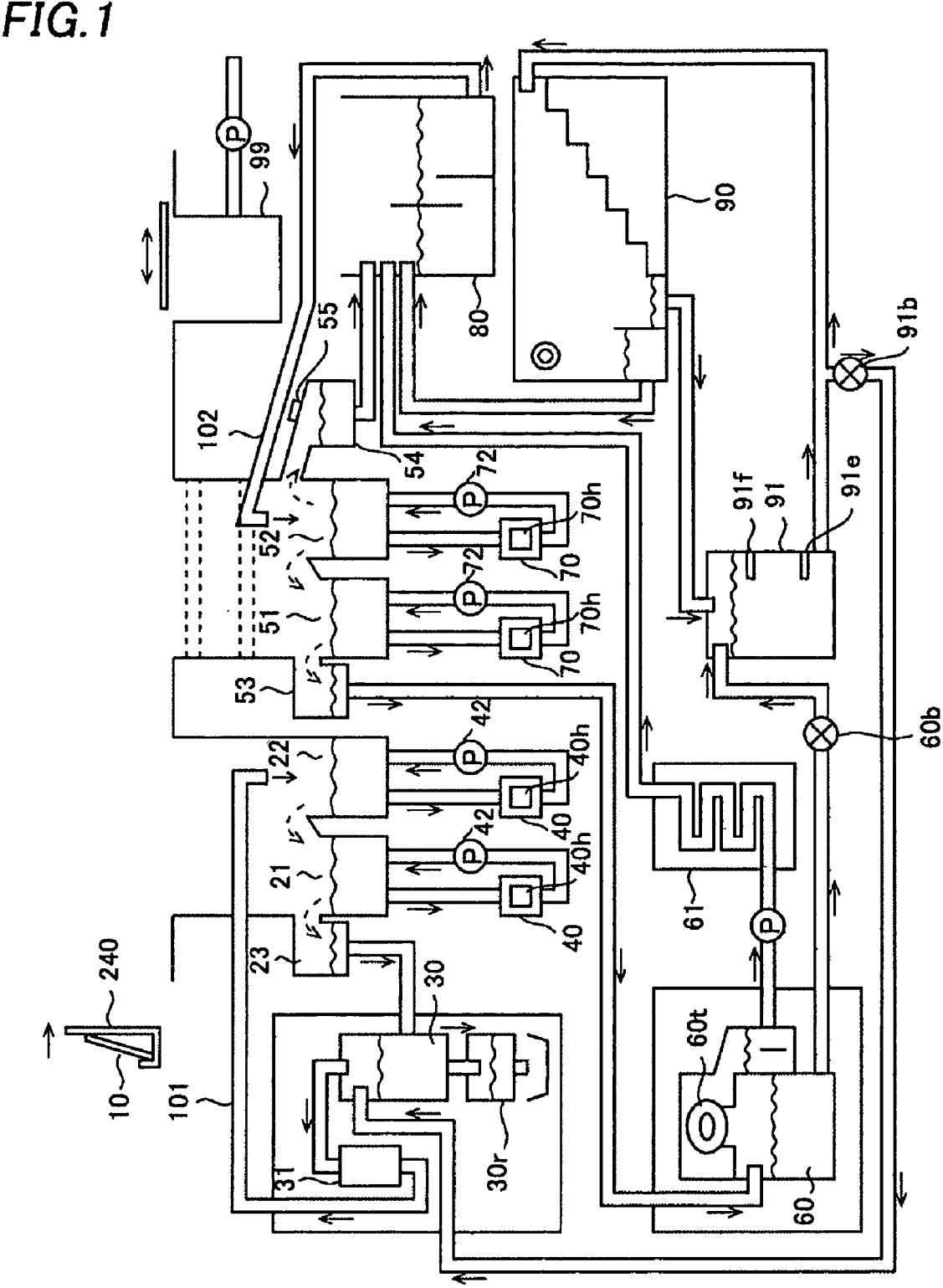
FIGS. 1 to 3 show views for explaining a cleaning system of a cleaning apparatus of an embodiment of the invention.

First, a structure of the cleaning system of the cleaning apparatus of the embodiment will be described with reference to the drawings. FIG. 1 shows a view for explaining the cleaning system of the cleaning apparatus of the embodiment. It is noted that components for the carrying system are omitted in FIG. 1.

As shown in FIG. 1, the cleaning system of the cleaning apparatus of the embodiment includes first and second cleaning tanks 21 and 22 for cleaning the mask 10 with a predetermined cleaning solution, and first and second rinse tanks 51 and 52 for rinsing the mask 10 cleaned in the first and second cleaning tanks 21 and 22 with a predetermined rinse solution.

The predetermined cleaning solution is a hydrocarbon type cleaning solution, for example. The predetermined rinse solution is a fluorine compound having a lower boiling point than the cleaning solution. For example, solvents generally called "hydrofluoroether" may be used. Specific gravity of the rinse solution is larger than that of moisture. By rinsing the cleaning solution having a higher surface tension with the rinse solution having lower surface tension, the rinse solution can enter fine spaces of the cleaning solution and can firmly catch the cleaning solution.

Next, description will be made on structures of the first and second cleaning tanks 21 and 22 in the cleaning system of the cleaning apparatus of the embodiment.

This cleaning apparatus includes an overflow tank 23 for the first cleaning tank 21, which accumulates the cleaning solution overflowing from the first cleaning tank 21. Furthermore, this cleaning apparatus includes a vacuum evaporator 30 for extracting the cleaning solution from the cleaning solution containing the organic material removed from the mask 10 by the cleaning process by so-called vacuum-distillation. The cleaning solution containing the organic material overflows from the first cleaning tank 21 into the overflow tank 23, and flows from the overflow tank 23 into the vacuum evaporator 30. The organic material precipitated at the bottom of the vacuum evaporator 30 is cooled in a cooling pot 30r and discharged outside.

In the described distillation of the cleaning solution, the cleaning solution is heated and distilled in a vacuum. This lowers the boiling point of the cleaning solution, which is about 155 degrees, and minimize heating temperature for the distillation.

Furthermore, this cleaning apparatus includes a first cooler 31 for cooling the cleaning solution vacuum-distilled by the vacuum evaporator 30 to room temperature. The cleaning solution cooled to room temperature by the first cooler 31 returns to the second cleaning tank 22 through a first return pipe 101.

In this embodiment, the room temperature ranges from 10 to 40 degrees, preferably from 20 to 30 degrees, and more preferably about 25 degrees.

By vacuum-distilling, cooling, and returning the cleaning solution as described above, the cleaning process of the mask 10 can be performed at room temperature. Therefore, it is possible to prevent as much as possible the damage to the mask 10 by stresses caused by heat.

Furthermore, each of the described first and second cleaning tanks 21 and 22 includes a first ultrasonic vibrator 21a and 22a for vibrating the cleaning solution so that the cleaning solution can sufficiently reach the surface of the mask 10. Each of the first and second cleaning tanks 21 and 22 further includes a first temperature regulator 40 for fine regulation of the temperature of the cleaning solution to room temperature so as to deal with the increase of the temperature of the cleaning solution caused by the vibration of the first ultrasonic vibrator.

The first temperature regulator 40 includes a first heat exchanger 40h and a pump 42, and the first heat exchanger 40h cools the cleaning solution of each of the first and second cleaning tanks 21 and 22. The first heat exchanger 40 performs fine regulation of the temperature of the cleaning solution in each of the first and second cleaning tanks 21 and 22 to room temperature by flowing or stopping flowing the cleaning solution cooled by the first heat exchanger 40h into each of the first and second cleaning tanks 21 and 22 through the pump 42.

The cleaning solution is circulated and filtered through a filter. As shown in FIG. 1, a filter can be provided in a circulating route, that is, in a route through the cleaning tank 21, the first temperature regulator 40, the pump 42, and the cleaning tank 21. Alternatively, the filter can be provided in a different route from this, that is, in a route through the cleaning tank 21, the filter, the pump 42, and the cleaning tank 21, which is formed in parallel with the above route.

As described above, the fine regulation of the temperature of the cleaning solution of each of the first and second cleaning tanks 21 and 22 can be performed by the first temperature regulator 40.

Next, description will be made on structures of the first and second rinse tanks 51 and 52 in the cleaning system of the cleaning apparatus of the embodiment.

This cleaning apparatus includes an overflow tank 53 for the first rinse tank 51, which accumulates the rinse solution overflowing from the first rinse tank 51.

Furthermore, this cleaning apparatus includes an atmospheric evaporator 60 for removing impurities from the rinse solution by atmospheric distillation at atmospheric pressure. The impurities include a small amount of the organic material entering the first rinse tank 51 with the mask 10 and a small amount of the cleaning solution of the second cleaning tank 22 attached to the mask 10. The rinse solution overflows from the first rinse tank 51 into the overflow tank 53, and then flows from the overflow tank 53 into the atmospheric evaporator 60.

If the boiling point of this rinse solution is about 60 degrees for example, it is not necessary to perform vacuum-distillation for lowering the boiling point, such as the case with the distillation of the cleaning solution having the boiling point of about 160 degrees. Therefore, the distillation of the rinse solution is performed at atmospheric pressure (at atmospheric pressure) by the atmospheric evaporator 60. The rinse solution evaporated in the atmospheric distillation is liquefied by a trap coil 60t at temperature liquefying the rinse solution.

Furthermore, this cleaning apparatus includes a second cooler 61 for cooling the rinse solution distilled at atmospheric pressure by the atmospheric evaporator 60 to room temperature. The rinse solution cooled to room temperature by the second cooler 61 returns to the second rinse tank 52 through a second return pipe 102.

A moisture separation tank 80 is provided between the second cooler 61 and the second return pipe 102. This moisture separation tank 80 separates the rinse solution containing moisture by the atmospheric distillation into moisture and the rinse solution. The rinse solution separated from moisture returns to the second rinse tank 52 through the second return pipe 102.

The cleaning apparatus further includes a collection tank 54 for collecting the evaporated rinse solution from the first rinse tank 51 or the second rinse tank 52. The collection tank 54 is set at such temperature that a vapor pressure ratio between the second rinse tank 52 and the collection tank 54 becomes 150:1 to 10:1, for example. The collection tank 54 includes a third cooler 55. By cooling the collection tank 54 to about 25 degrees below zero by the third cooler 55, the vapor pressure of the collection tank 54 lowers to about 1/100 of the vapor pressure of the first rinse tank 51 or the second rinse tank 52, and thus the evaporated rinse solution flows into the collection tank 54. The rinse solution flowing into the collection tank 54 flows into the moisture separation tank 80, is separated from moisture, and returns to the second rinse tank 52 through the second return pipe 102.

By distilling at atmospheric pressure, cooling, and returning the rinse solution as described above, the rinsing process to the mask 10 can be performed at room temperature. Therefore, it is possible to prevent as much as possible the damage to the mask 10 by stresses caused by heat.

In the described cleaning apparatus, since the mask 10 is immersed in the rinse solution after immersed in the cleaning solution, a small amount of the cleaning solution enters the rinse solution of the first rinse tank 51 with the mask 10 and is mixed with the rinse solution. For dealing with this problem, this cleaning apparatus includes a separator 90 for separating the rinse solution containing the cleaning solution into the cleaning solution and the rinse solution. In this separator 90, the rinse solution containing the cleaning solution is evaporated, and only the evaporated rinse solution is cooled and liquefied by a cooler or the like, and collected. The rinse solution thus separated flows into the moisture separation tank 80, is separated from moisture, and is returned to the second rinse tank 52 through the second return pipe 102.

The cleaning apparatus further includes a pool tank 91 for accumulating the cleaning solution separated by the separator 90 and the rinse solution (containing the cleaning solution) which is not distilled yet in the atmospheric evaporator 60 and flowing these solutions to the separator 90.

The pool tank 91 includes an upper limit sensor 91f for detecting an upper limit of a liquid level of the cleaning solution and the rinse solution flowing and accumulating in the tank 91, and a lower limit sensor 91e for detecting a lower limit of the liquid level thereof. By opening and closing a valve 60b, the rinse solution from the atmospheric evaporator 60 is flowed into the pool tank 91 until the upper limit sensor 91f detects the liquid level and then stopped. Then, this rinse solution containing the cleaning solution is flowed into the separator 90, and separated into the cleaning solution and the rinse solution.

The rinse solution flowing into the separator 90 is stopped when the lower limit sensor 91e detects the liquid level of the rinse solution in the pool tank 91. Then, the rinse solution from the atmospheric evaporator 60 is flowed into the pool tank 91 until the upper limit sensor 91f detects the liquid level and then stopped. Then, the rinse solution containing the cleaning solution is flowed into the separator 90. As the number of repetition of separation into the cleaning solution and the rinse solution increases more, the rinse solution accumulating in the pool tank 91 contains more cleaning solution flowing from the separator 90 and accumulating in the pool tank 91. Therefore, the speed of evaporating and separating the rinse solution from the cleaning solution in the separator 90 becomes low.

Then, in the pool tank 91, the time from the start of the separation process by the separator 90 to the reach of the liquid level of the rinse solution to the lower limit is counted based on a detection result of the lower limit sensor 91e. When the time becomes longer than a predetermined time, the cleaning solution contained in the rinse solution in the pool tank 91 is assumed to reach saturation and the separation process by the separator 90 is stopped. After the separation process by the separator 90 is stopped, the separated cleaning solution in the pool tank 91 flows into the vacuum evaporator 30.

By the described process, the cleaning solution in the rinse solution is separated from the rinse solution, and the rinse solution can be reused.

Furthermore, each of the described first and second rinse tanks 51 and 52 includes a second ultrasonic vibrator 51a and 51b for vibrating the rinse solution so that the rinse solution can sufficiently reach the surface of the mask 10. Each of the first and second rinse tanks 51 and 52 further includes a second temperature regulator 70 for fine regulation of the temperature of the rinse solution to room temperature so as to deal with the increase of the temperature of the rinse solution caused by the vibration by the second ultrasonic vibrator.

The second temperature regulator 70 includes a second heat exchanger 70h and a pump 72, and the second heat exchanger 70h cools the rinse solution of each of the first and second rinse tanks 51 and 52. The second temperature regulator 70 performs fine regulation of the temperature of the rinse solution in each of the first and second rinse tanks 51 and 52 to room temperature by flowing or stopping flowing the rinse solution cooled in the second heat exchanger 70h into each of the first and second rinse tanks 51 and 52 through the pump 72.

As described above, the fine regulation of the temperature of the rinse solution in the first and second rinse tanks 51 and 52 can be performed by the second temperature regulator 70.

Figure 2:
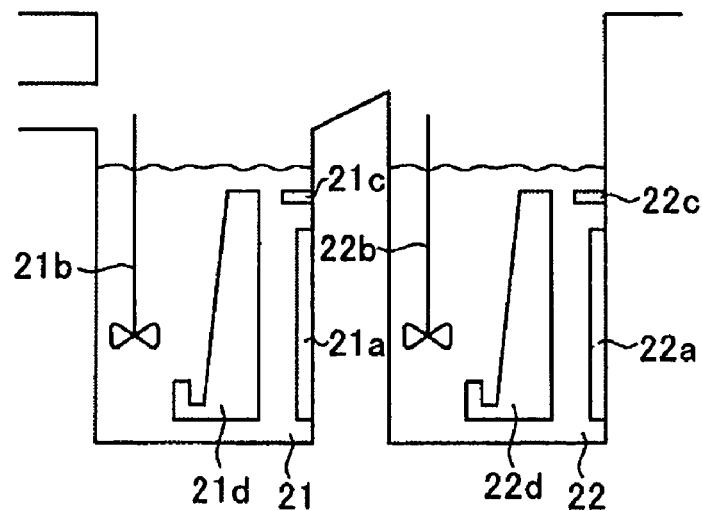
Figure 3:
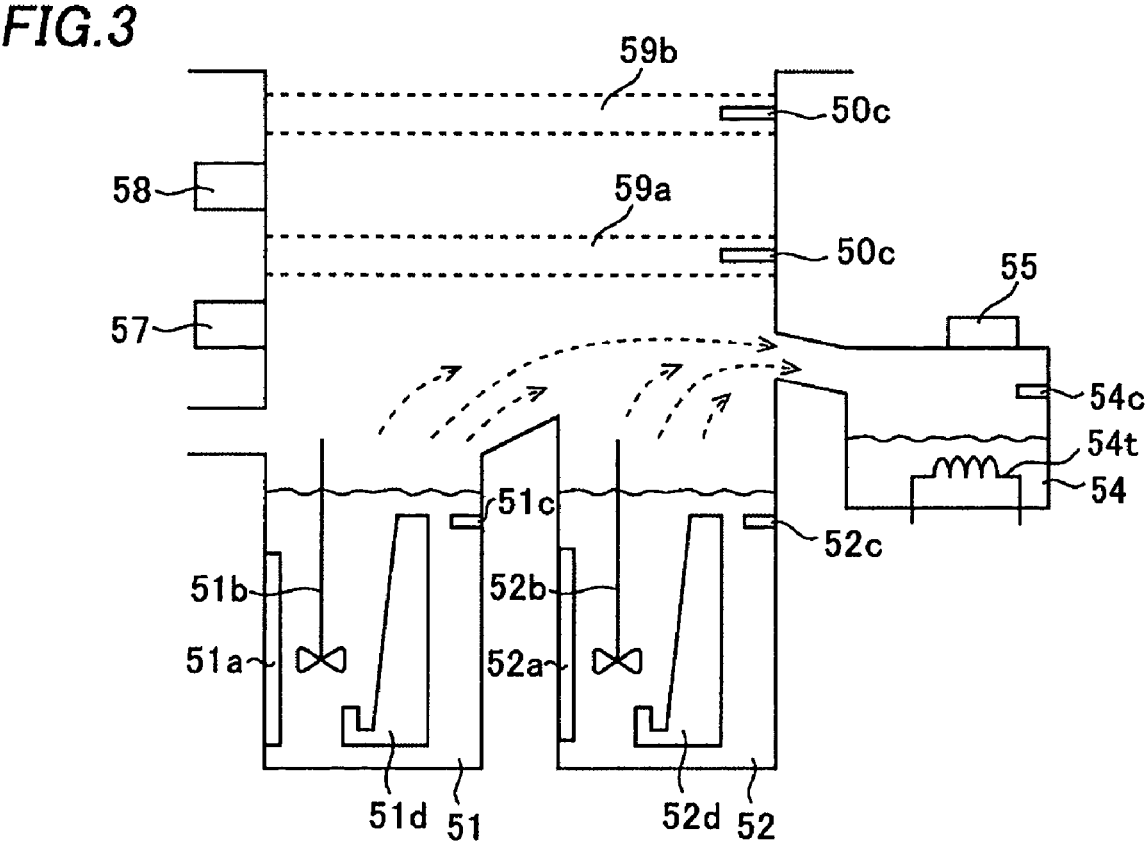

Next, the concrete structures of the first and second cleaning tanks 21 and 22 and the first and second rinse tanks 51 and 52 will be described. FIG. 2 shows a cross-sectional view for explaining the first and second cleaning tanks 21 and 22. FIG. 3 shows a cross-sectional view for explaining the first and second rinse tanks 51 and 52 and the collection tank 54. It is noted that the overflow tanks 23 and 53 are omitted in FIGS. 2 and 3.

As shown in FIG. 2, the first and second cleaning tanks 21 and 22 include first ultrasonic vibrators 21a and 22a, first agitators 21b and 22b, first temperature sensors 21c and 22c, and first movable immersion carriers 21d and 22d, respectively. Each of the first ultrasonic vibrators 21a and 22a vibrates the cleaning solution in a position facing the mask 10 so that the cleaning solution can sufficiently reach the surface of the mask 10. The first ultrasonic vibrators 21a and 22a have a larger effect by a one-sheet cleaning method where the mask 10 is cleaned one by one than by a batch cleaning method where a plurality of the masks 10 is cleaned at a time. The first agitators 21b and 22b agitate the cleaning solution so as to flow the cleaning solution inside the first and second cleaning tanks 21 and 22.

Each of the first temperature sensors 21c and 22c detects the temperature of the cleaning solution as a reference temperature when the first temperature regulator 40 regulates the temperature of the cleaning solution in each of the first and second cleaning tanks 21 and 22. The first immersion carriers 21d and 22d hold and immerse the mask 10 in the cleaning solution when the mask 10 is cleaned. It is preferable that the first immersion carriers 21d and 22d hold and move the mask 10 in a vertically-standing position so that the cleaning solution can sufficiently reach the surface of the mask 10.

As described above, in the first and second cleaning tanks 21 and 22, the cleaning process to the mask 10 with the cleaning solution can be performed sufficiently by vibrating the cleaning solution by the first ultrasonic vibrators 21a and 22a, agitating the cleaning solution by the first agitators 21b and 22b, and moving the mask 10 by the first immersion carriers 21d and 22d.

In the similar manner to this, as shown in FIG. 3, the first and second rinse tanks 51 and 52 include a second ultrasonic vibrators 51a and 52a, second agitators 51b and 52b, second temperature sensors 51c and 52c, and second movable immersion carriers 51d and 52d, respectively. Each of the second ultrasonic vibrators 51a and 52a vibrates the rinse solution so that the rinse solution can sufficiently reach the surface of the mask 10. The second agitators 51b and 52b agitate the rinse solution so as to flow the rinse solution inside the first and second rinse tanks 51 and 52.

Each of the second temperature sensors 51c and 52c detects the temperature of the rinse solution as a reference temperature when the second temperature regulator 70 regulates the temperature of the rinse solution in each of the first and second rinse tanks 51 and 52. The second immersion carriers 51d and 52d hold and immerse the mask 10 in the rinse solution when the mask 10 is rinsed. It is preferable that the second immersion carriers 51d and 52d hold and move the mask 10 in a vertically-standing position so that the rinse solution can sufficiently reach the surface of the mask 10.

Furthermore, the collection tank 54 connected with the second rinse tank 52 includes a third cooler 55 and a third temperature sensor 54c. The third cooler 55 cools the collection tank 54 to lower temperature than the temperature of the first and second rinse tanks 51 and 52, based on a detection result of the third temperature sensor 54c. The target temperature for cooling the collection tank 54 is about 25 degrees below zero, for example. The evaporated rinse solution led to the collection tank 54 is liquefied by a so-called trap coil 54t and collected in the collection tank 54.

Furthermore, third and fourth temperature regulators 57 and 58 and two fourth temperature sensors 50c are provided above the liquid level of the rinse solution in the first and second rinse tanks 51 and 52. The third temperature regulator 57 lowers the temperature above the liquid level of the rinse solution of the first and second rinse tanks 51 and 52 to about 10 degrees below zero, for example, thereby forming a first air layer 59a preventing the evaporated rinse solution from diffusing to the outside of the first and second rinse tanks 51 and 52. The fourth temperature regulator 58 regulates temperature above the first air layer 59a to slightly higher temperature than room temperature, thereby forming a second air layer 59b preventing air on the outside of the first and second rinse tanks 51 and 52 from flowing into the tanks 51 and 52.

It is preferable that the regulation of the temperature by the third and fourth temperature regulators 57 and 58 is performed based on the temperature detection result of the two fourth temperature sensors 50c. In a case that the temperature is to be regulated to the predetermined temperature by the third and fourth temperature regulators 57 and 58, any one or both of the two fourth temperature sensors 50c can be omitted.

As described above, in the first and second rinse tanks 51 and 52, the rinsing process to the mask 10 with the rinse solution can be performed sufficiently by vibrating the rinse solution by the second ultrasonic vibrators 51a and 52a, agitating the rinse solution by the second agitators 51b and 52b, and moving the mask 10 by the second immersion carriers 51d and 52d.

Furthermore, since the third and fourth temperature regulators 57 and 58 are provided above the liquid level of the rinse solution of the first and second rinse tanks 51 and 52, the evaporated rinse solution in the first and second rinse tanks 51 and 52 can be collected in the collection tank 54 without diffusing in the air.

Next, description will be made on a flowing route of the cleaning solution in the cleaning system of the cleaning apparatus of the embodiment of the invention. When the cleaning process is performed to the mask 10 by immersing the mask 10 in the first cleaning tank 21 and then in the second cleaning tank 22, the organic material removed from the mask 10 is mixed with the cleaning solution. Then, when the cleaning solution returned through the first return pipe 101 flows into the second cleaning tank 22, the cleaning solution in the first and second cleaning tanks 21 and 22 overflows into the first overflow tank 23. The overflowed cleaning solution flows into the vacuum evaporator 30. The air pressure in the vacuum evaporator 30 is reduced to about 0.8, for example, and the vacuum evaporator 30 is heated inside to about 120 degrees, for example, thereby performing vacuum-distillation to the cleaning solution. The organic material precipitated at the bottom of the vacuum evaporator 30 is cooled by the cooling pot 30r and discharged outside regularly.

The boiling point of this cleaning solution is about 160 degrees, for example. However, the boiling point is reduced by heating and distilling the cleaning solution in a vacuum state, so that the heat temperature for the distillation process can be reduced to about 120 degrees, for example. Furthermore, this distillation process is performed in a vacuum state, so that moisture hardly enters the cleaning solution in this distillation process.

The cleaning solution removed from the organic material by the vacuum-distillation is cooled to room temperature by the first cooler 31, and returns to the second cleaning tank 22 through the first return pipe 101.

Some of the cleaning solution in each of the first and second cleaning tanks 21 and 22 is cooled by the first heat exchanger 40h set in the first temperature regulator 40, and the cooled cleaning solution flows into each of the first cleaning tank 21 and the second cleaning tank 22 through the pump 42 appropriately.

Next, description will be made on a flowing route of the rinse solution in the cleaning system of the cleaning apparatus of the embodiment of the invention. When the rinsing process is performed to the mask 10 by immersing the mask 10 in the first rinse tank 51 and then in the second rinse tank 52, the cleaning solution removed from the mask 10 is mixed with the rinse solution. Then, when the rinse solution returned through the second return pipe 102 flows into the second rinse tank 52, the rinse solution in the first and second rinse tanks 51 and 52 overflows into the second overflow tank 53.

The overflowed rinse solution flows into the atmospheric evaporator 60. The boiling point of the rinse solution is 60 degrees, for example, so that it is not necessary to perform vacuum-distillation for reducing the boiling point, as is performed to the cleaning solution having the boiling point of about 160 degrees. Therefore, the atmospheric evaporator 60 is heated inside to about 65 degrees which exceed the boiling point, at atmospheric pressure, thereby performing atmospheric distillation to the rinse solution.

By this atmospheric distillation, impurities such as the organic material and so on, which enter the rinse solution with the mask 10 together with the cleaning solution, is removed from the rinse solution. Although the rinse solution distilled at atmospheric pressure contains moisture entering in the distillation process, the rinse solution is to be separated into moisture and the rinse solution by utilizing the specific gravity of the rinse solution larger than that of moisture. This rinse solution is cooled to room temperature by the second cooler 61 and flows into the moisture separation tank 80.

The rinse solution removed from moisture in the moisture separation tank 80 returns to the second rinse tank 52 through the second return pipe 102.

Some of the rinse solution in the atmospheric evaporator 60, which is not distilled at atmospheric pressure yet, that is, the rinse solution containing a small amount of the cleaning solution (mixed with the rinse solution at the mask 10) flows into the pool tank 91 by the valve 60b. After the rinse solution flows into the pool tank 91 to reach the upper limit of the pool tank 91, the valve 60b closes and the rinse solution is stopped flowing. Then, the rinse solution in the pool tank 91 flows into the separator 90 and the separation process into the rinse solution and the cleaning solution starts.

When the lower limit sensor 91e detects the liquid level of the rinse solution in the pool tank 91, the valve 60b opens to flow the rinse solution from the atmospheric evaporator 60 into the pool tank 91.

The rinse solution separated by the separator 90 is removed from moisture in the moisture separation tank 80 by utilizing the specific gravity of the rinse solution larger than that of moisture, and then returns to the second rinse tank 52 through the second return pipe 102. The cleaning solution separated by the separator 90 flows into the pool tank 91.

As the separation process into the cleaning solution and the rinse solution is repeated more, the rinse solution accumulating in the pool tank 91 contains more cleaning solution which flows from the separator 90 and accumulates in the pool tank 91. Therefore, the speed of evaporating and separating the rinse solution from the cleaning solution in the separator 90 becomes lower.

Then, in the pool tank 91, the time from the start of the separation process by the separator 90 to the reach of the liquid level of the rinse solution to the lower limit is counted based on the detection result of the lower limit sensor 91e detecting the liquid level of the rinse solution in the pool tank 91. When the time becomes longer than the predetermined time, the cleaning solution contained in the rinse solution in the pool tank 91 is assumed to reach saturation and the separation process by the separator 90 is stopped. Then, the valve 91b, which closes so far, opens, and the separated cleaning solution in the pool tank 91 flows into the vacuum evaporator 30.

The rinse solution evaporated in the first and second rinse tanks 51 and 52 is led to and collected in the collection tank 54 cooled to about 25 degrees below zero by the third cooler 55, which is lower than the temperatures of the first and second rinse tanks 51 and 52. The rinse solution collected in the collection tank 54 flows into the moisture separation tank 80, moisture is removed from the rinse solution by utilizing the specific gravity 1.5 of the rinse solution to moisture, and the rinse solution returns to the second rinse tank 52 through the second return pipe 102.

Figure 9:
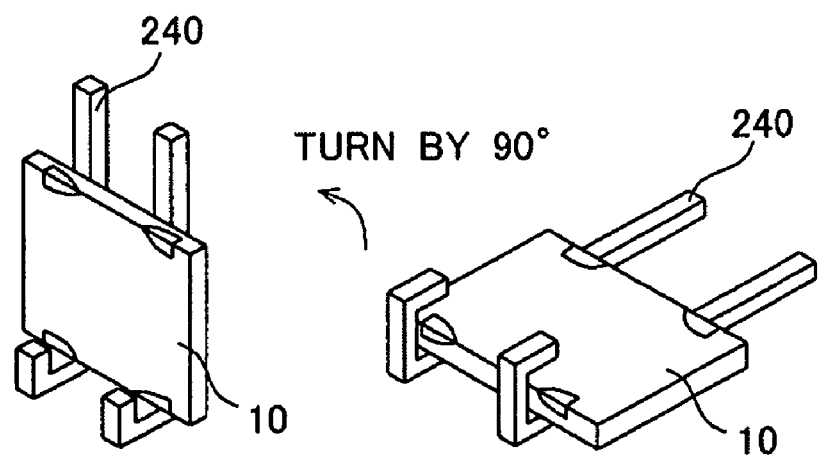
FIGS. 9 and 10 show perspective views for explaining the carrying system of the cleaning apparatus of the embodiment of the invention.
Figure 10:
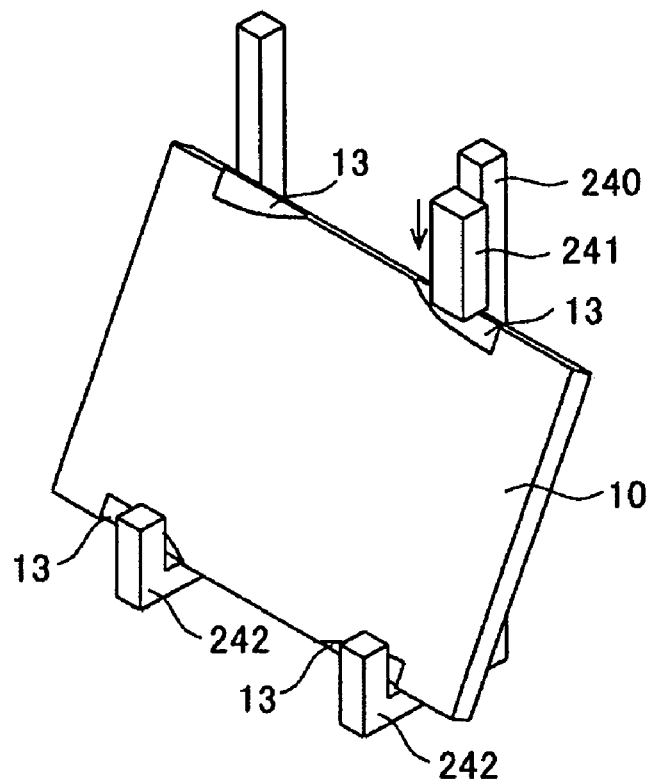

Next, the carrying system of the cleaning apparatus of the embodiment of the invention will be described with reference to the drawings. FIGS. 4-8 and 11-14 show cross-sectional views for explaining the carrying system of the cleaning apparatus of the embodiment. FIGS. 9 and 10 show perspective views for explaining the carrying system of the cleaning apparatus of the embodiment. For the components of the cleaning system, only the ones necessary for explaining the carrying system are shown in FIGS. 4 to 14.

As shown in FIGS. 4 to 14, the carrying system of the cleaning apparatus of the embodiment includes a cassette 210 set on a stage 200 and storing a plurality of masks 10 laid horizontally, a first transfer device 220 having a first arm 221 for taking one mask 10 from the cassette 210, a second transfer device 230 having a second arm 231 for holding the mask 10, and a carrying device 240 for carrying the mask 10 to the first and second cleaning tanks 21 and 22 and the first and second rinse tanks 51 and 52. The carrying device 240 has hooks 242 for holding one side of the mask 10 when carrying the mask 10.

Figure 4:
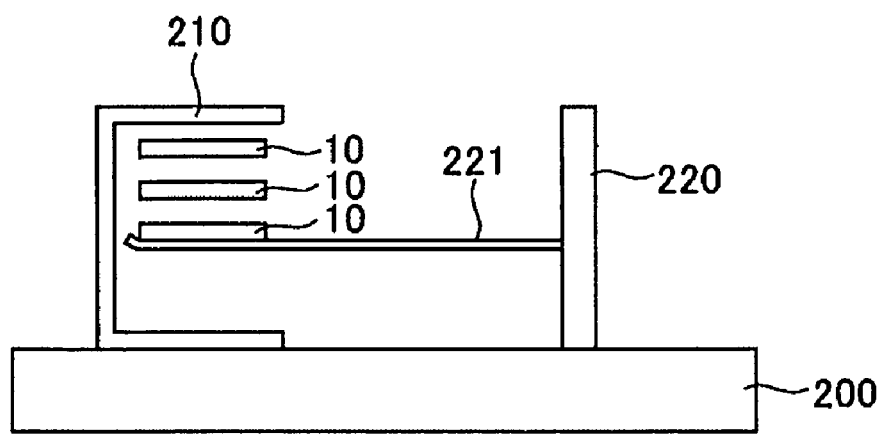
FIGS. 4 to 8 and 11 to 14 show cross-sectional views for explaining a carrying system of the cleaning apparatus of the embodiment of the invention.
Figure 5:
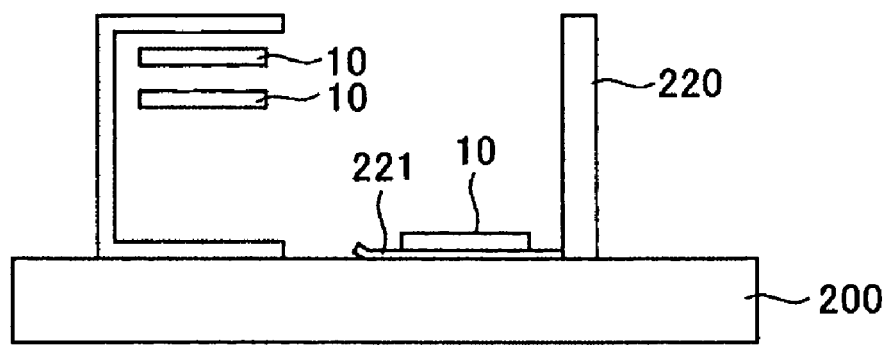
Figure 6:
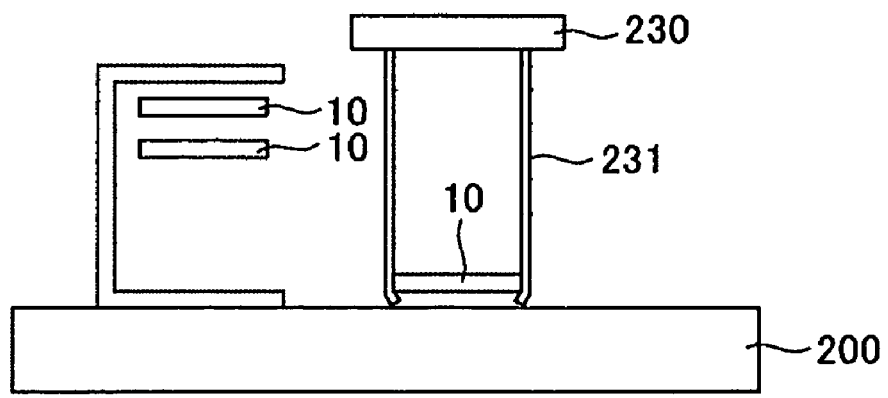
Figure 7:
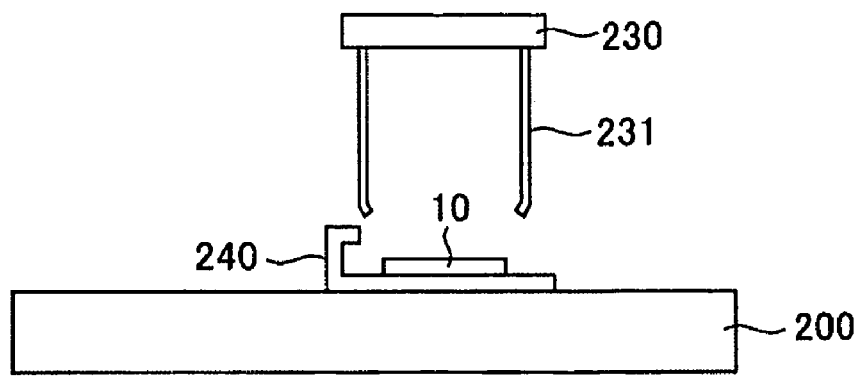

Next, description will be made on an operation of the carrying system of the cleaning apparatus of the embodiment of the invention. First, as shown in FIG. 4, the first arm 221 of the first transfer device 220 takes one mask 10 from the cassette 210 by its stretching and contracting motion. Then, as shown in FIG. 5, the first transfer device 220 lowers the first arm 221 and sets the mask 10 in a predetermined position on the stage 200. Then, the second transfer device 230 holds the mask 10 by its second arm 231 as shown in FIG. 6, and sets the mask 10 on the carrying device 240 as shown in FIG. 7.

Figure 8:
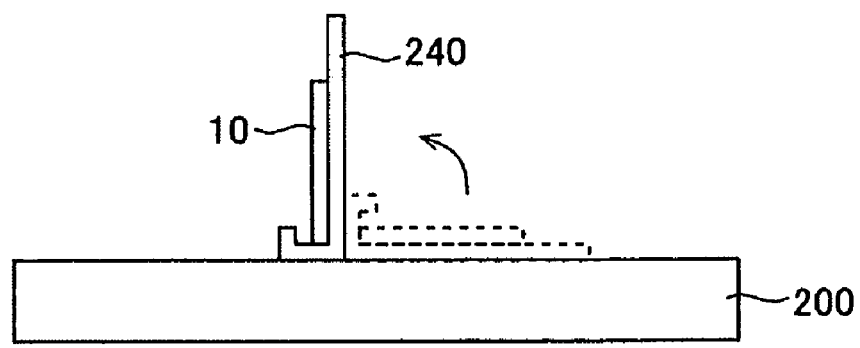

Then, as shown in FIG. 8, the carrying device 240 supporting the mask 10 stands up vertically by turning by 90 degrees in the vertical direction. Accordingly, the mask 10 set on the carrying device 240 stands up by turning by 90 degrees in the vertical direction. The carrying device 240 and the mask 10 at this point of the carrying procedure are shown in the perspective view of FIG. 9.

Since the carrying device 240 and the mask 10 stand up vertically as shown in FIG. 9, it is possible to prevent the stresses, which are caused by gravity or by movement of the mask with solution, from being applied to the thin metal film forming the mask 10 to cause metal fatigue and damage. Furthermore, the mask 10 standing up vertically is easier to dry. In this embodiment, the mask 10 is designed to positioned in the carrying device 240 so that the angle between a horizontal plane and the mask 10 is larger than 45 degrees.

The turning angle of the carrying device 240 and the mask 10 is not necessarily 90 degrees. That is, the carrying device 240 and the mask 10 can be turned by any angle other than horizontally and vertically, as long as metal fatigue or damage does not occur to the thin metal film forming the mask 10 by stress caused by gravity.

Furthermore, as shown in the perspective view of FIG. 10, a hold member 241 provided in the carrying device 240 is fitted on the lock portion 13 of the mask 10 by pressure. Therefore, the mask 10 can be held by the hold member 241 and the hooks 242 of the carrying device 240 without damaging the surface of the thin metal film of the mask 10.

Figure 11:
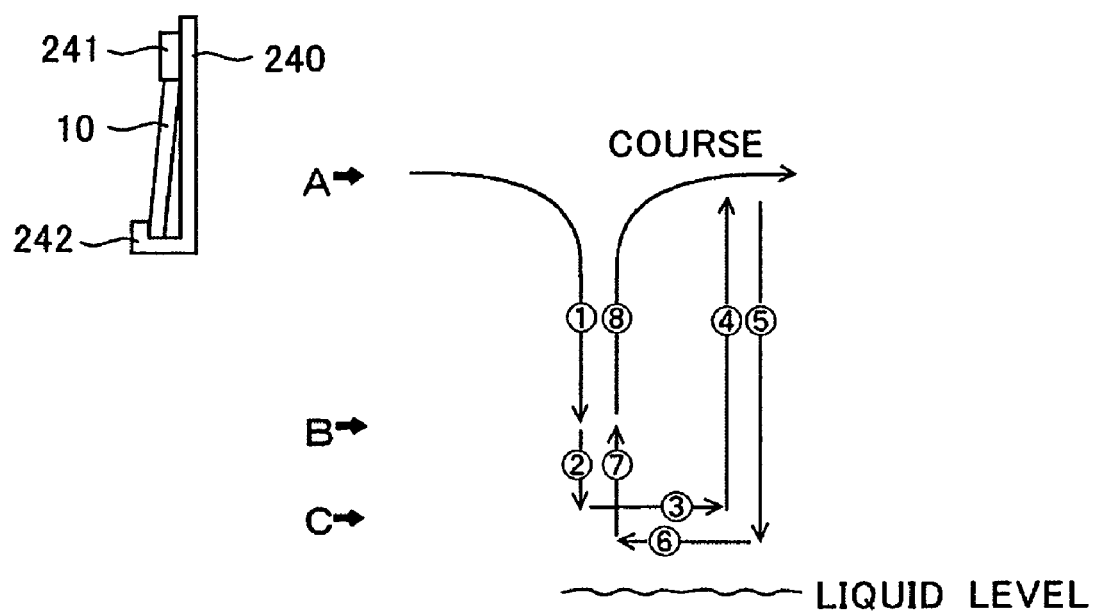

The mask 10 thus held by the carrying device 240 is carried to the cleaning system of the cleaning apparatus, that is, to the first and second cleaning tanks 21 and 22 (and the first and second rinse tanks 51 and 52). When carrying the mask 10, the carrying device 240 moves in the vertical and horizontal directions sequentially as shown in FIG. 11 so as to move along a predetermined route having curves, as shown by routes 1 to 8 in FIG. 11. A, B, and C in FIG. 11 indicate levels in the vertical direction above the liquid level of the cleaning solution or the rinse solution.

By moving the carrying device 240 along such a predetermined route with the curves, it is possible to prevent the metal fatigue or damage to the mask 10 made of the thin metal film due to the stresses caused by a shock applied when the movement is switched from the vertical direction to the horizontal direction and from the horizontal direction to the vertical direction.

The carrying device 240 moves at a predetermined speed. This speed is determined not to cause the metal fatigue or damage in the mask 10. Alternatively, this predetermined speed is may be determined not to cause evaporation of the rinse solution in the first and second rinse tanks 51 and 52 by the air flow occurring while the carrying device 240 is moving.

Figure 12:
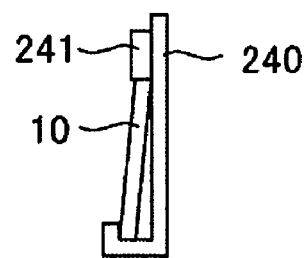
Figure 12:
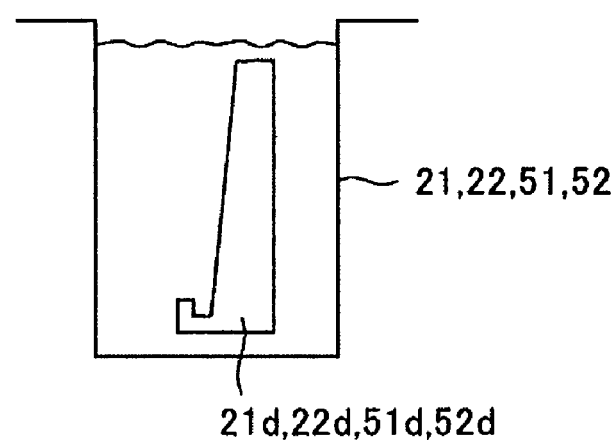
Figure 13:
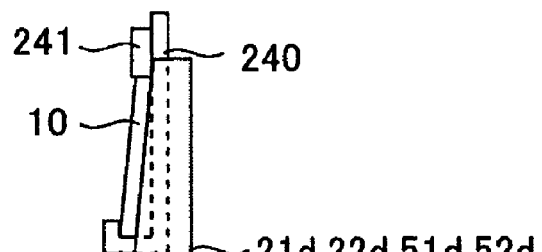
Figure 13:
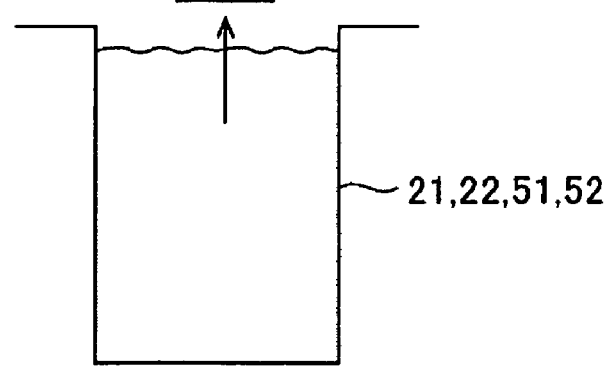

Next, as shown in FIG. 12, the carrying device 240 holding the mask 10 is carried above the first cleaning tank 21. Then, as shown in FIG. 13, the first immersion carrier 21d set in the first cleaning tank 21 rises above the liquid level of the cleaning solution. Then, when the first immersion carrier 21d rises and reaches the same level as that of the carrying device 240, or when the carrying device 240 moves to and reaches the same level as that of the immersion carrier 21d rising above the liquid level of the cleaning solution, the mask 10 held by the hold member 241 of the carrying device 240 is released and transferred to the immersion carrier 21d.

Figure 14:
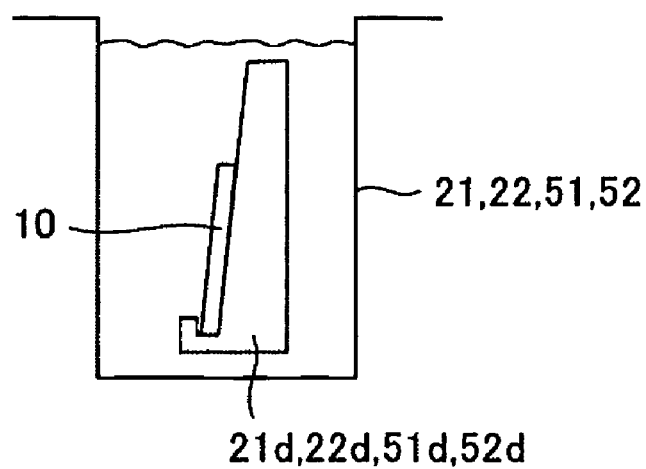

Then, as shown in FIG. 14, the first immersion carrier 21d set holding the mask 10 lowers into the cleaning solution, and the mask 10 is immersed in the cleaning solution. When the mask 10 is taken out from the cleaning solution, it follows the processes shown in FIGS. 14, 13, and 12 in this order. In the similar manner to the case of the first cleaning tank 21 shown in FIGS. 12 to 14, the carrying device 240 holding the mask 10 is carried above the second cleaning tank 22. Then, the mask 10 is immersed in the cleaning solution by the first immersion carrier 21d, and then taken out therefrom.

As described above, the cleaning process can be performed without immersing the carrying device 240 in the cleaning solution when the mask 10 is immersed in the cleaning solution of the first and second cleaning tanks 21 and 22. That is, the cleaning solution can be prevented from attaching to the carrying device 240, as much as possible. Therefore, the cleaning solution of the first and second cleaning tanks 21 and 22 is likely to be carried to the rinse solution of the first and second rinse tanks 51 and 52 by the carrying device 240.

Next, in the similar manner to the case of the first cleaning tank 21 shown in FIGS. 12 to 14, the carrying device 240 holding the mask 10 is carried above the first rinse tank 51. The mask 10 is immersed into the rinse solution by the second immersion carrier 51d, and then the mask 10 is taken out therefrom. Then, the carrying device 240 holding the mask 10 is carried above the second rinse tank 52. The mask 10 is then immersed into the rinse solution by the second immersion carrier 52d, and then taken out therefrom.

As described above, the rinsing process can be performed without immersing the carrying device 240 into the rinse solution when the mask 10 is immersed into the rinse solution of the first and second rinse tanks 51 and 52. That is, the rinse solution does not attach to the carrying device 240. Therefore, in the next cleaning process, the rinse solution is less likely to be attached to the carrying device 240 and to be mixed to the cleaning solution of the first and second cleaning tanks 21 and 22 by the carrying device 240.

It is preferable that the described carrying device 240 moves along the routes 1 to 4 shown in FIG. 11 when immersing the mask 10 into the cleaning solution or the rinse solution. In detail, first, the carrying device 240 moves from the level A to the level B along the route 1 and temporarily stops there. At this time, the carrying device 240 does not suddenly stop but stops after gradually decelerating so as to apply no stress to the mask 10. Then, when the immersion carrier 21d, 22d, 51d, or 52d rises and reaches the level B, the carrying device 240 moves from the level B to the level C while transferring the mask 10 to the immersion carrier 21d, 22d, 51d, or 52d. Then, the carrying device 240 moves in the horizontal direction along the route 3 so as to deviate from the immersion carrier 21d, 22d, 51d, or 52d. Furthermore, the carrying device 240 moves in the vertical direction along the route 4 so as to return to the level A.

Furthermore, it is preferable that the carrying device 240 moves along the routes 5 to 8 shown in FIG. 11 when taking the mask 10 from the cleaning solution or the rinse solution. In detail, first, the carrying device 240 moves from the level A to the level C along the route 5. Then, the carrying device 240 moves in the horizontal direction along the route 6 so as to approach the immersion carrier 21d, 22d, 51d, or 52d. Then, the carrying device 240 moves from the level C to the level B along the route 7 and temporarily stops there. Then, the carrying device 240 moves from the level B to the level A along the route 8 while transferring the mask 10 from the immersion carrier 21d, 22d, 51d, or 52d rising at the level B to the carrying device 240 by hooking up the mask 10. At this time, too, it is preferable that the carrying device 240 gradually increases its moving speed so as not to rise up rapidly. This enables movement of the mask 10 without applying the stress to the mask 10.

After the carrying device 240 carries one mask 10 to the first and second cleaning tanks 21 and 22 and the first and second rinse tanks 51 and 52, it is also possible that the other mask 10 different from the carried mask 10 is carried to the other tank.

Finally, the carrying device 240 holding the mask 10 is carried to a vacuum drier 99 shown in FIG. 1 and dried there.

As described above, the stresses to the mask 10 can be reduced by moving the mask 10 along the routes 1 to 8 shown in FIG. 11 having curves, gradually reducing the moving speed (in the downward direction) of the mask 10, and gradually increasing the moving speed (in the upward direction) of the mask 10. When carrying no mask, the carrying device 240 can move rapidly as long as the carrying device 240 does not hit against sidewalls of the tanks or the immersion carriers, and can move along the routes having arcs.

Although the cleaning solution and the rinse solution are the hydrocarbon type cleaning solution and the hydrofluoroether type rinse solution in this embodiment respectively, the cleaning solution and the rinse solution may be any solutions other than these solutions, as long as the cleaning process (remove of the organic material for the organic EL element) and the rinsing process can be performed to the mask 10 and the solutions have a similar boiling points and specific gravities as the hydrocarbon type cleaning solution and the hydrofluoroether type rinse solution.

What is claimed is:

1. A cleaning apparatus cleaning a deposition mask used for depositing organic electroluminescent materials, comprising:
   a cleaning tank containing a cleaning solution therein and configured to receive the deposition mask for cleaning;
   a vacuum evaporator receiving the cleaning solution from the cleaning tank and evaporating the cleaning solution in a vacuum;
   a first cooler cooling the cleaning solution evaporated by the vacuum evaporator;
   a first return pipe returning the cleaning solution cooled by the first cooler to the cleaning tank;
   a rinse tank containing a rinse solution therein and configured to receive the deposition mask cleaned in the cleaning tank;
   an atmospheric evaporator receiving the rinse solution from the rinse tank and evaporating the rinse solution in an atmospheric pressure;
   a second cooler cooling the rinse solution evaporated by the atmospheric evaporator; and
   a second return pipe returning the rinse solution cooled by the second cooler to the rinse tank.

2. The cleaning apparatus of claim 1, further comprising an ultrasonic vibrator vibrating the cleaning solution in the cleaning tank.

3. The cleaning apparatus of claim 2, further comprising a temperature sensor detecting a temperature of the cleaning solution in the cleaning tank, and a temperature regulator maintaining the temperature of the cleaning solution in the cleaning tank at a predetermined temperature based on a detection result of the temperature sensor.

4. The cleaning apparatus of claim 3, further comprising a heat exchanger disposed in the temperature regulator, wherein the temperature regulator regulates a flow of the cleaning solution cooled by the heat exchanger into the cleaning tank to maintain the temperature of the cleaning solution.

5. The cleaning apparatus of claim 1, further comprising an ultrasonic vibrator vibrating the rinse solution in the rinse tank.

6. The cleaning apparatus of claim 5, further comprising a temperature sensor detecting a temperature of the rinse solution in the rinse tank, and a temperature regulator maintaining the temperature of the rinse solution in the rinse tank at a predetermined temperature based on a detection result of the temperature sensor.

7. The cleaning apparatus of claim 6, further comprising a heat exchanger disposed in the temperature regulator, wherein the temperature regulator regulates a flow of the rinse solution cooled by the heat exchanger into the rinse tank to maintain the temperature of the rinse solution.

8. The cleaning apparatus of claim 1, further comprising a collection tank comprising a third cooler, wherein the third cooler cools the rinse solution evaporated in the rinse tank so that the cooled rinse solution is collected in the collection tank, and the collected rinse solution is returned to the rinse tank through the second return pipe.

9. The cleaning apparatus of claim 8, further comprising a temperature sensor detecting a temperature of the collection tank, wherein the third cooler cools the collection tank so as to generate a difference in a vapor pressure between the rinse tank and the collection tank based on the detected temperature.

10. The cleaning apparatus of claim 9, further comprising a moisture separation tank separating moisture from the rinse solution collected by the collection tank, wherein the rinse solution separated from the moisture by the moisture separation tank is returned to the rinse tank through the second return pipe.

11. The cleaning apparatus of claim 8, further comprising a moisture separation tank separating moisture from the rinse solution collected by the collection tank, wherein the rinse solution separated from the moisture by the moisture separation tank is returned to the rinse tank through the second return pipe.

12. The cleaning apparatus of claim 1, further comprising a moisture separation tank that is provided in a circulation loop of the rinse solution comprising the rinse tank, the atmospheric evaporator, the second cooler and the second return pipe and separates moisture from the rinse solution cooled by the second cooler, wherein the rinse solution separated from the moisture by the moisture separation tank is returned to the rinse tank through the second return pipe, and there is no moisture separation tank provided in a circulation loop of the cleaning solution comprising the cleaning tank, the vacuum evaporator, the first cooler and the first return pipe.

13. The cleaning apparatus of claim 1, further comprising a separator separating the rinse solution containing the cleaning solution into the cleaning solution and the rinse solution, and a pool tank receiving the cleaning solution separated by the separator and the rinse solution containing the cleaning solution sent from the atmospheric evaporator, wherein the solutions received by the pool tank are supplied to the separator.

14. The cleaning apparatus of claim 13, further comprising a lower limit sensor detecting a lower limit of a liquid level of a content of the pool tank, wherein the content of the pool tank is supplied to the vacuum evaporator based on a detection result of the lower limit sensor.

15. The cleaning apparatus of claim 1, further comprising a first holder configured to hold the deposition mask in the cleaning tank and a second holder configured to hold the deposition mask in the rinse tank.

16. The cleaning apparatus of claim 1, wherein the rinse solution comprises a solvent comprising a fluorine compound.

* * * * *